US007909009B2

(12) United States Patent
Zimmermann et al.

(10) Patent No.: US 7,909,009 B2
(45) Date of Patent: Mar. 22, 2011

(54) CABLE RETAINER FOR AN INTERNAL COMBUSTION ENGINE

(75) Inventors: Helmut Zimmermann, Berglen (DE); Jens Knauss, Remshalden (DE); Ronald Hartinger, Leutenbach (DE); Dietmar Lämmle, Sulzbach (DE); Günter Römig, Schwaikheim (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 332 days.

(21) Appl. No.: 12/113,659

(22) Filed: May 1, 2008

(65) Prior Publication Data

US 2008/0272268 A1 Nov. 6, 2008

(30) Foreign Application Priority Data

May 3, 2007 (DE) ........................ 10 2007 020 681

(51) Int. Cl.
*H01T 13/00* (2006.01)
*F16C 1/10* (2006.01)
*F16L 3/22* (2006.01)

(52) U.S. Cl. .................. 123/143 C; 74/502.4; 248/68.1

(58) Field of Classification Search .............. 123/198 R, 123/195 A, 143 R, 143 C; 74/502.4; 248/68.1
See application file for complete search history.

(56) References Cited

U.S. PATENT DOCUMENTS

| | | | | | |
|---|---|---|---|---|---|
| 2,997,531 | A | * | 8/1961 | Oldham et al. | 248/68.1 |
| 3,342,168 | A | * | 9/1967 | Burdette | 123/143 R |
| 3,854,114 | A | * | 12/1974 | Kloth et al. | 439/398 |
| 4,519,486 | A | * | 5/1985 | Hermanson | 477/204 |
| 4,889,006 | A | * | 12/1989 | Kolinske et al. | 123/400 |
| 5,046,464 | A | * | 9/1991 | Hisatomi et al. | 123/143 C |
| 5,179,919 | A | * | 1/1993 | Foltz et al. | 123/143 C |
| 5,349,930 | A | * | 9/1994 | Maruyama et al. | 123/143 C |
| 6,149,108 | A | * | 11/2000 | Weickenmeier et al. | 248/74.1 |
| 6,289,856 | B1 | | 9/2001 | Noguchi | |

* cited by examiner

*Primary Examiner* — Noah Kamen
(74) *Attorney, Agent, or Firm* — Foley & Lardner LLP

(57) ABSTRACT

An internal combustion engine has a cylinder which has a cylinder longitudinal axis. The internal combustion engine has at least one cooling fin. In order to route the cable in a defined fashion so that the internal combustion engine can be arranged even in a constricted installation space, a cable retainer is provided which is arranged on at least one cooling fin of the internal combustion engine and which retains at least one cable. A cable retainer for securing at least one cable to an internal combustion engine has at least one receptacle for at least one cable and at least one means for positioning the cable retainer on the internal combustion engine.

24 Claims, 5 Drawing Sheets

CABLE RETAINER FOR AN INTERNAL COMBUSTION ENGINE

CROSS-REFERENCE TO RELATED PATENT APPLICATIONS

The right of foreign priority is claimed under 35 U.S.C. §119(a) based on Federal Republic of Germany Application No. 10 2007 020 681.1, filed May 3, 2007, the entire contents of which, including the specification, drawings, claims and abstract, are incorporated herein by reference.

BACKGROUND OF THE INVENTION

The invention relates to an internal combustion engine of the generic type specified in the preamble of claim 1, and to a cable retainer for securing at least one cable to an internal combustion engine.

An internal combustion engine which has a cylinder and cooling ribs is known, for example, from U.S. Pat. No. 6,289,856 B1. Such internal combustion engines are used, for example, in hand-held tools such as power saws, cut-off grinders, clearing saws or the like, in order to drive the tool.

The ignition of the internal combustion engine is provided in known internal combustion engines by means of a spark-plug which is connected to an ignition module via an ignition cable. It is also possible to provide other cables, for example for controlling or for grounding.

In order to permit simple handling of hand-held tools it is desirable for the housing in which the internal combustion engine is arranged to be kept as small as possible. However, at the same time it is necessary to avoid damage to the cables.

In known internal combustion engines, cables of the ignition module are laid loosely. The cables are merely secured to one another by means of cable binders. As a result, the position of the cables relative to the internal combustion engine and also relative to a housing, for example the housing of a tool, is not fixed. The cables can move relative to the internal combustion engine during operation. Therefore, sufficient installation space must be made available for the cables to ensure that the cables cannot come to bear on adjacent components owing to their movement during operation since this could lead to wear.

SUMMARY OF THE INVENTION

The invention is based on the object of providing an internal combustion engine of the generic type which permits an internal combustion engine to be installed in a comparatively small housing. A further object of the invention is to provide a cable retainer for an internal combustion engine.

This object is achieved by means of an internal combustion engine having the features of claim 1. In terms of the cable retainer, the object is achieved by means of a cable retainer having the features of claim 18.

The cable retainer fixes the position of the at least one cable relative to the internal combustion engine. As a result, the cable can be routed right against the internal combustion engine. Owing to the defined position of the cable, cable wear can be avoided. As a result, the internal combustion engine can be installed even under constricted installation conditions.

The cable retainer is advantageously arranged on the cylinder of the internal combustion engine. The cable retainer advantageously has means for positioning the cable retainer on the internal combustion engine. This makes it possible to ensure that the cable retainer is placed in a defined position, which cannot be confused, on the internal combustion engine. The cable retainer is easily secured to the internal combustion engine if the cable retainer has at least one slot with which the cable retainer is plugged onto a cooling fin. The slot can have play here, in particular with respect to the cooling fin, in order to compensate tolerances of the internal combustion engine. The cable retainer advantageously has a first slot which receives a first cooling fin which is positioned, in particular, transversely with respect to the cylinder longitudinal axis. In particular, the cable retainer has a second slot which receives a second cooling fin which extends transversely with respect to the first cooling fin. The first slot advantageously extends approximately parallel to the cylinder longitudinal axis. Through the slot, the cable retainer is respectively secured in a perpendicular direction with respect to the corresponding cooling fin. As a result, the position of the cable retainer on the internal combustion engine is fixed even if the cable retainer can execute slight movements with respect to the internal combustion engine owing to tolerances and owing to play. These movements can be allowed since they do not affect the securing of the position of the cables with respect to the internal combustion engine.

The cable retainer advantageously has a receptacle in which at least one cable is retained. The receptacle is bounded, in particular, by at least two limbs, wherein at least one of the limbs is sprung. The sprung embodiment of at least one limb allows the cable to be pressed between the limbs and therefore easily mounted in the receptacle. The sprung embodiment of the limbs permits, in particular, clamping of the cable so that the cable cannot move in the receptacle, either in its longitudinal direction or transversely with respect to the receptacle. It is also possible, for example, to provide three or more limbs which are arranged, in particular, offset in the longitudinal direction of the cable and alternately on each side of the cable.

In order to permit simple mounting of the cable in the cable retainer even under restricted spatial conditions, there is provision for the receptacle to be accessible via a longitudinal opening which is bounded by at least two limbs, wherein at least one limb has, adjacent to the longitudinal opening, an insertion slope which extends inclined with respect to the longitudinal direction of the cable. Owing to the inclined arrangement of the insertion slope, the cable can be arranged on the receptacle in an oblique position with respect to the longitudinal direction of the receptacle and can be mounted from an oblique orientation in the receptacle. The oblique mounting permits the cable to be arranged in the receptacle even if only very small spring travel values of the limbs are possible, for example owing to the comparatively small possible overall size of the cable retainer.

In order to permit the largest possible spring travel of the limbs there is provision that a slot extends adjacent to the bottom area of the receptacle, wherein the side walls of the slot are inclined with respect to one another by an angle which opens toward the internal combustion engine. As a result, the entire side wall of the slot can be moved together with the limb which is arranged thereon. As a result, the possible spring travel can be made larger without adversely affecting the stability of the cable retainer.

There is provision for at least one cable to be held clamped in the receptacle. The receptacle advantageously has a lower section and an upper section between which a constriction is arranged, wherein a cable which closes off the lower section of the receptacle is held clamped in the upper section. In particular, at least one cable which is retained in the receptacle by the cable in the upper section is arranged in the lower section. The diameter of the cable in the lower section is advantageously smaller than the diameter of the cable in the upper section. As a result, the position can easily be secured, the position of a plurality of cables being advantageously secured at the same time.

In order to define on which cooling fins the cable retainer will be mounted there is provision for the cable retainer to have a stop which is adjacent to a third cooling fin, with the third cooling fin being made lower than at least one adjacent cooling fin. Owing to the stop it is not possible to arrange the cable retainer next to a cooling fin which is made higher than the third cooling fin. In this context, the stop does not have to bear against the third cooling fin. The height at which the stop extends is between the height of the third cooling fin and the height of the adjacent, relatively high cooling fin. As a result, the position of the cable retainer on the internal combustion engine is fixed. Incorrect mounting is avoided.

Means for securing the cable retainer to the internal combustion engine are advantageously provided. The securing means secure the cable retainer which is plugged onto the internal combustion engine. The internal combustion engine advantageously has an ignition module, and the cable retainer is arranged adjacent to the ignition module, wherein at least one cable which is retained by the cable retainer is connected to the ignition module. This makes it possible to ensure that the cables which are made to lead away from the ignition module are led past the internal combustion engine in a defined fashion. The ignition module is advantageously fixed to at least one screw boss of the internal combustion engine via an insulating element. The insulating element advantageously insulates the ignition module thermally from the internal combustion engine. The insulating element expediently secures the cable retainer to the internal combustion engine. The insulating element must, in any case, be fixed to the internal combustion engine. Since the insulating element is used to secure the cable retainer, no additional components are required. No additional mounting steps are necessary. As a result, the cable retainer is secured to the internal combustion engine in a simple and reliable way.

A simple configuration is obtained if the cable retainer has a bearing web, wherein the cable retainer is plugged onto the internal combustion engine in an insertion direction, and wherein the insulating element secures the bearing web in the insertion direction of the cable retainer. As a result, the cable retainer is secured counter to the insertion direction in a simple way and without additional components.

In order to fix the direction in which the cables are routed, there is provision for the insulating element to have at least one stop for the connection of a cable which is retained in the cable retainer.

For a cable retainer for securing at least one cable to an internal combustion engine there is provision for the cable retainer to have at least one receptacle for at least one cable, and at least one means for positioning the cable retainer on the internal combustion engine. As a result, the cable retainer can easily ensure the relative position of the cable with respect to the internal combustion engine.

The cable retainer advantageously has a first slot and a second slot for plugging the cable retainer onto at least one cooling fin of the internal combustion engine. As a result, the cable retainer can easily be arranged on the internal combustion engine. The slots secure the position of the cable retainer relative to the internal combustion engine. At the same time, the slots can have play with respect to the cooling fins of the internal combustion engine in order to compensate tolerances, for example fabrication tolerances of the internal combustion engine. The slots advantageously extend transversely, and in particular approximately perpendicularly, with respect to one another, in a plane which extends perpendicularly with respect to the insertion direction. As a result the slots fix the position of the cable retainer in two directions which are transverse, in particular perpendicular, with respect to one another.

There is provision for a slot to extend adjacent to the bottom area of the receptacle, wherein the side walls of the slot are inclined with respect to one another in the insertion direction by an angle, wherein the angle opens toward the plug-in opening of the slot. The receptacle is advantageously bounded by two limbs, wherein at least one of the limbs is embodied in a sprung fashion.

In order to make the cable retainer easy to manufacture and low in weight there is provision for the cable retainer to be composed of plastic. The cable retainer is advantageously made of polyamide. As a result, sufficient heat resistance of the cable retainer is provided. The cable retainer is expediently embodied in one piece.

Further objects, features and advantages of the present invention will become apparent from the detailed description of preferred embodiments that follows, when considered together with the accompanying Figures of drawing.

BRIEF DESCRIPTION OF THE DRAWINGS

An exemplary embodiment of the invention is explained in the text which follows with reference to the drawing, in which.

DETAILED DESCRIPTION OF THE PREFERRED EMBODIMENTS

Figure 1:
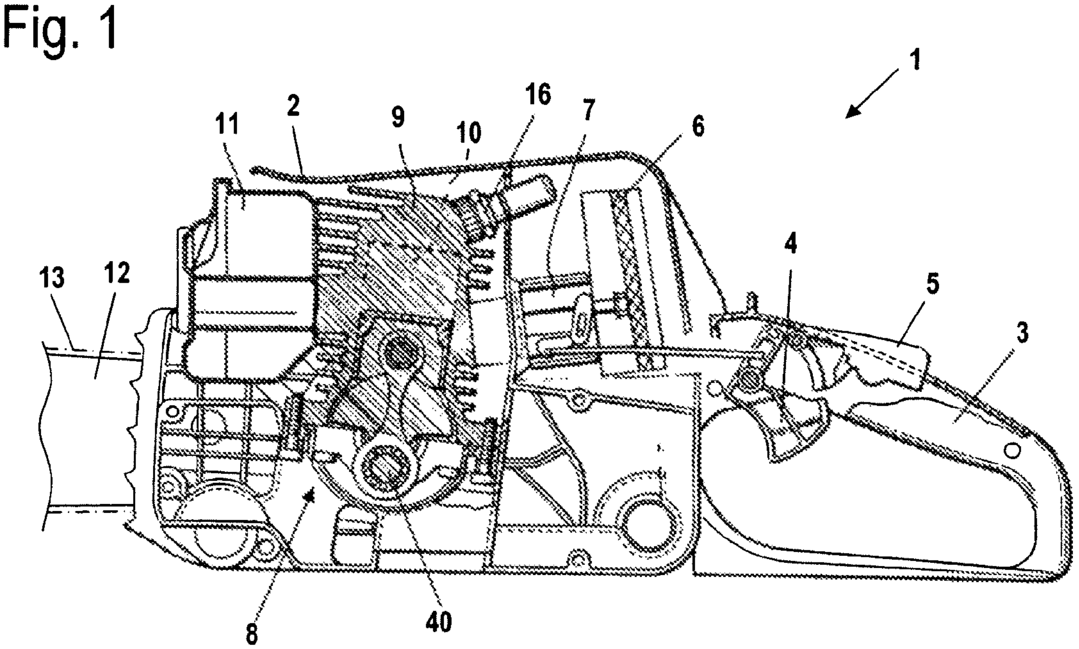
FIG. 1 shows a schematic longitudinal section through a power saw.

FIG. 1 shows a power saw as an exemplary embodiment of a portable, hand-held tool. The invention can also be used with other hand-held tools such as, for example, cut-off grinders, clearing saws or the like. Use in internal combustion engines may also be possible for other purposes of use. The power saw 1 has a housing 2 to which a rear handle 3 is secured. A throttle lever 4 and a throttle lever lockout 5 are pivotably mounted on the rear handle 3. The throttle lever 4 is used to start an internal combustion engine 8 which is arranged in the housing 2. The internal combustion engine 8 is embodied as a single-cylinder engine. The internal combustion engine 8 is, in particular, a two-stroke engine, advantageously a two-stroke engine which operates with a scavenging gas shield. The internal combustion engine 8 can, however, also be a four-stroke engine, in particular a mixture-lubricated four-stroke engine. The internal combustion engine 8 has a cylinder 9 in which a combustion chamber 10 is formed. A sparkplug 16 projects into the combustion chamber 10.

The internal combustion engine 8 is connected to a carburetor 7 which is controlled by the throttle lever 4. An air filter 6 is secured to the carburetor 7. The internal combustion engine 8 sucks in fuel and combustion air via the air filter 6 and the carburetor 7 during operation. An exhaust gas silencer 11 is arranged at the outlet of the cylinder 9. The power saw 1 has a guide rail 12 which guides a saw chain 13. The saw chain 13 is driven by the internal combustion engine 8 so that it runs around the guide rail 12. To do this, the internal combustion engine 8 has a crankshaft 40 which is driven in rotation around a crankshaft axis 14.

Figure 2:
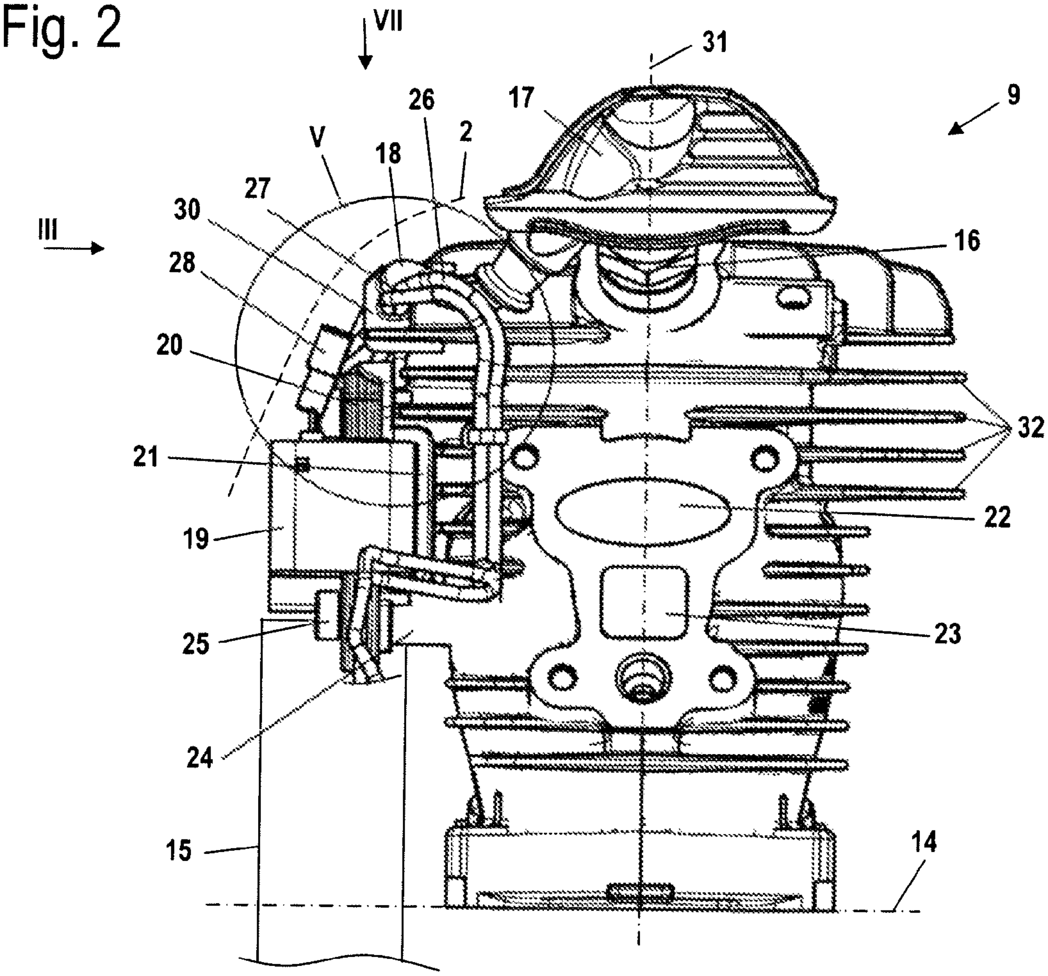
FIG. 2 shows the cylinder of the internal combustion engine of the power saw from FIG. 1 in a side view.

FIG. 2 shows the cylinder 9 of the internal combustion engine 8. The internal combustion engine 8 is embodied as a scavenging gas shield two-stroke engine and has an air inlet 22 for scavenging gas shield air and a mixture inlet 23 for a fuel/air mixture. A plurality of cooling fins 32 are arranged on the cylinder 9. In this context, cooling fins 32 are provided which protrude perpendicularly with respect to the cylinder longitudinal axis 31 and cooling fins 32 are provided which extend parallel to the cylinder longitudinal axis 31. A different orientation of the cooling fins 32 may also be advantageous.

Figure 3:
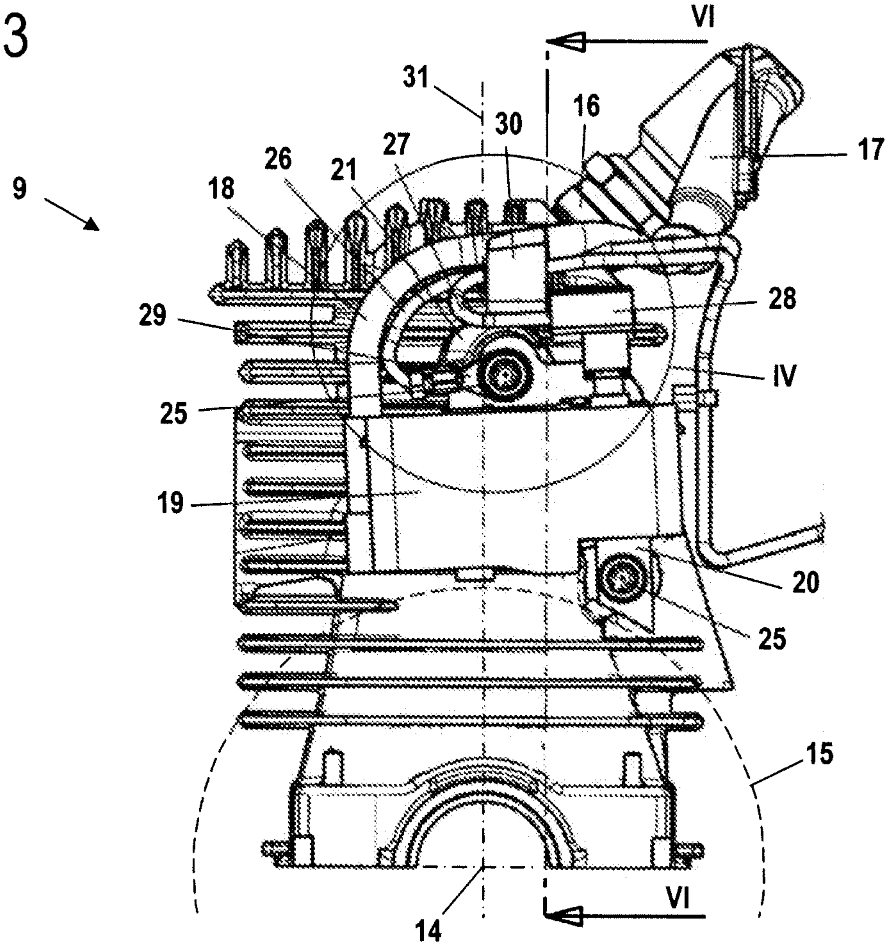
FIG. 3 shows a side view of the cylinder in the direction of the arrow III in FIG. 2.

As is shown in FIGS. 2 and 3, an ignition module 19 is secured to the cylinder 9 by means of two fastening screws 25. The ignition module 19 has a yoke 20 which is embodied as a laminated core and which ends at the outer circumference of a fan wheel 15 which is shown schematically in FIGS. 2 and 3. The fan wheel 15 is secured to the crankshaft 40 and is driven in rotation about the crankshaft axis 14. Ignition magnets (not shown) which induce a voltage in a coil of the ignition module 19 are arranged on the fan wheel 15. This voltage is used to ignite the internal combustion engine 8. In addition, the voltage can also be used to supply energy to further components of the power saw 1.

An ignition cable 18 is provided for supplying power to the sparkplug 16, said ignition cable 18 connecting the ignition module 19 to a sparkplug connector 17. The sparkplug connector 17 is removeably plugged onto the sparkplug 16 and it supplies the sparkplug 16 with ignition energy. As is shown in particular by FIG. 3, a grounding cable 26 is secured to the yoke 20 by means of a connection 29. Furthermore, a connecting plug 28, which connects a control cable 27 to the ignition module 19, is plugged onto the ignition module 19. The ignition cable 18, the grounding cable 26 and the control cable 27 are secured to the cylinder 9 using a common cable retainer 30.

As is shown by FIG. 2, an insulating element 21, which insulates the ignition module 19 thermally from the cylinder 9 of the internal combustion engine 8, is arranged between the ignition module and the internal combustion engine 8.

Figure 4:
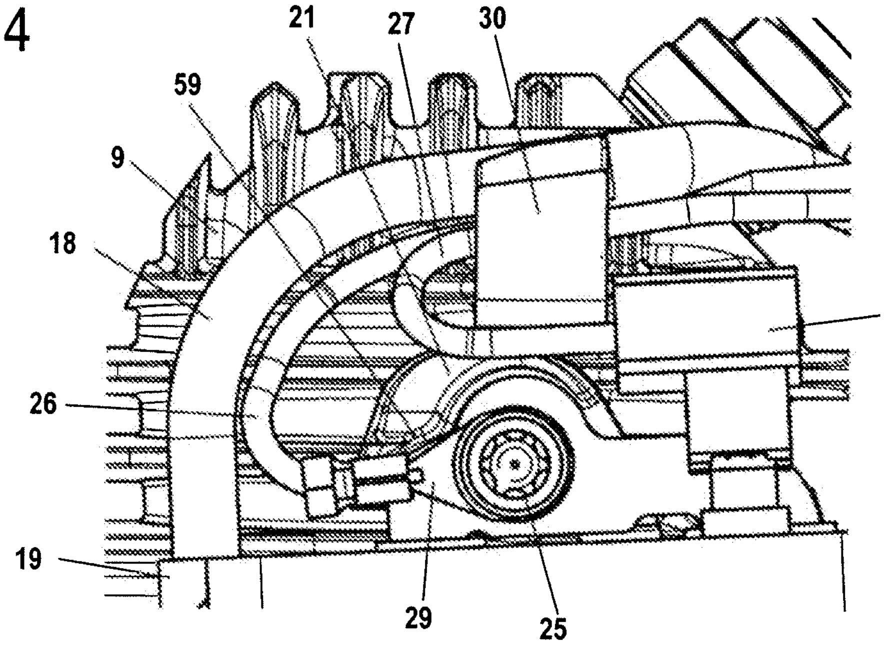
FIG. 4 shows the detail IV in FIG. 3 in an enlarged illustration.

As is shown by FIG. 4, the insulating element 21 has a stop 59 for the connection 29 of the grounding cable 26. In the exemplary embodiment, the connection 29 is embodied as a pinch connector. The connection 29 bears against the stop 59. This ensures that the grounding cable 26 is firstly guided away from the fastening screw 25, approximately perpendicularly with respect to the cylinder longitudinal axis 31, in the direction of the exhaust gas silencer 11 of the internal combustion engine 8. The control cable 27 is also guided away from the connecting plug 28 in this direction. Both cables 26 and 27 are then routed in a loop to the cable retainer 30.

Figure 5:
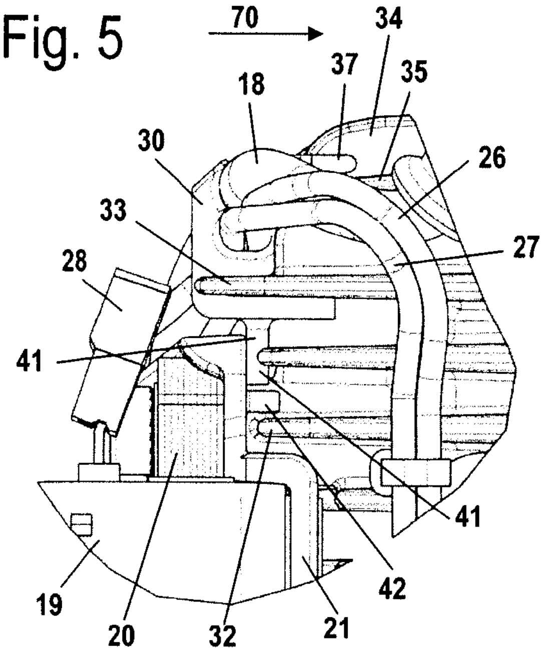
FIG. 5 shows the detail V from FIG. 2 in an enlarged illustration.
Figure 6:
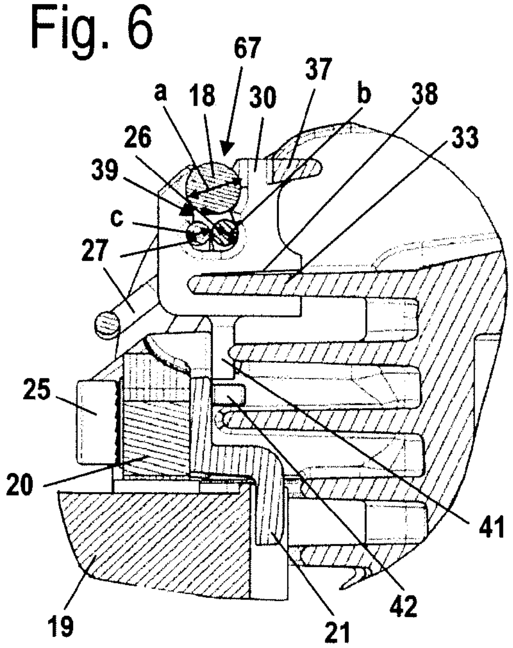
FIG. 6 shows a detail of a section along the line VI-VI in FIG. 3.

As is shown by FIGS. 5 and 6, the cable retainer 30 can be plugged onto a first cooling fin 33 of a cylinder 9 in an insertion direction 70. The first cooling fin 33 extends perpendicularly with respect to the cylinder longitudinal axis 31 and forms the head fin which faces away from the crank casing of the internal combustion engine 8. The cable retainer 30 has a bearing web 41 which extends in the direction of the ignition module 19. The bearing web 41 is retained by the insulating element 21 on the cylinder 9 in the insertion direction 70. The bearing web 41 is located between the insulating element 21 and the cylinder 9. As a result, the cable retainer 30 cannot slip counter to the insertion direction 70 of the first cooling fin 33. The insulating element 21 has a positioning pin 42 which is arranged above a cooling fin 32 of the cylinder 9 and which secures the position of the insulating element 21.

Figure 7:
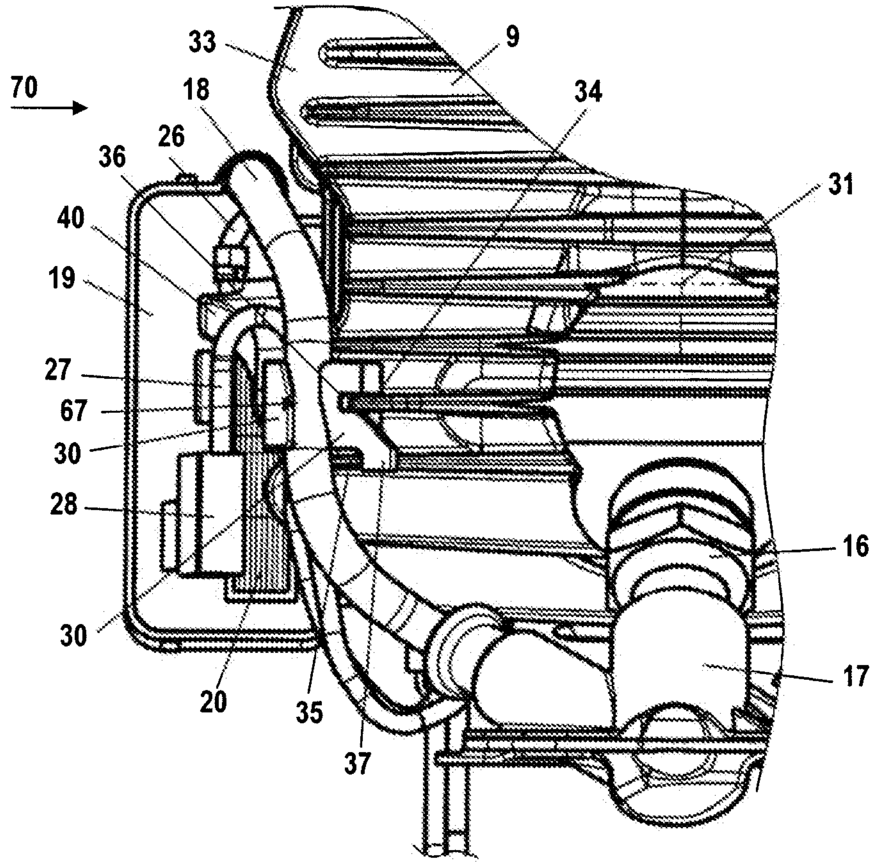
FIG. 7 shows a detail through a plan view of the cylinder in the direction of the arrow VII in FIG. 2.

As is also shown in FIG. 6, the cable retainer 30 has a projection 37 which constitutes a stop. The projection 37 bears against the upper side of a third cooling fin 35. However, it is also possible to provide for the projection 37 to be at a distance from the upper side of the third cooling fin 35. The third cooling fin 35 is lower than an adjacent second cooling fin 35 onto which the cable retainer 30 is plugged. The side of the projection 37 which faces the cooling fins is arranged at a level between the upper side of the third cooling fin 35 and the upper side of the second cooling fin 34. The second cooling fin 34 is also shown in FIG. 7. The projection 37 ensures that the plugging on of the cable retainer 30 onto the cylinder 9 can only occur adjacent to the low third cooling fin 35.

FIG. 6 also shows the arrangement of the cables 18, 26 and 27 on the cable retainer 30. The cable retainer 30 has a receptacle 39 in whose lower area the grounding cable 26 and control cable 27 are arranged one next to the other. The receptacle 39 has a longitudinal opening 67 through which the cables 26, 27, 18 can be plugged into the receptacle 39. The ignition cable 18 is arranged on the side of the cables 26 and 27 facing the longitudinal opening 67. The ignition cable 18 has a diameter which is significantly greater than the diameter b of the grounding cable 26 and than the diameter c of the control cable 27. The ignition cable 18 is retained clamped in the receptacle 39. The longitudinal opening 67 is therefore closed by the ignition cable 18 so that the cables 26 and 27 are secured in the receptacle 39 by the ignition cable 18. The diameters b and c of the grounding cable 26 and control cable 27 are advantageously of approximately the same size.

As is shown by FIG. 6, the cable retainer 30 has a first slot 38 which extends perpendicularly with respect to the cylinder longitudinal axis 31 and which is plugged onto the first cooling fin 33.

As is shown by FIG. 7, the cable retainer 30 has a second slot 36 which extends perpendicularly with respect to the first slot 38 and parallel to the cylinder longitudinal axis 31. The second slot 36 is plugged onto a second cooling fin 34. The cable retainer 30 is advantageously plugged onto the cooling fins 33 and 34 with play so that tolerances can be compensated. The two cooling fins 33 and 34 secure the cable retainer 30 in the parallel and perpendicular directions with respect to the cylinder longitudinal axis 31. Parallel to the insertion direction 70 the cable retainer 30 is secured by the insulating element 21. As a result, the cable retainer 30 is securely retained on the cylinder 9 in all three spatial directions.

Figure 8:
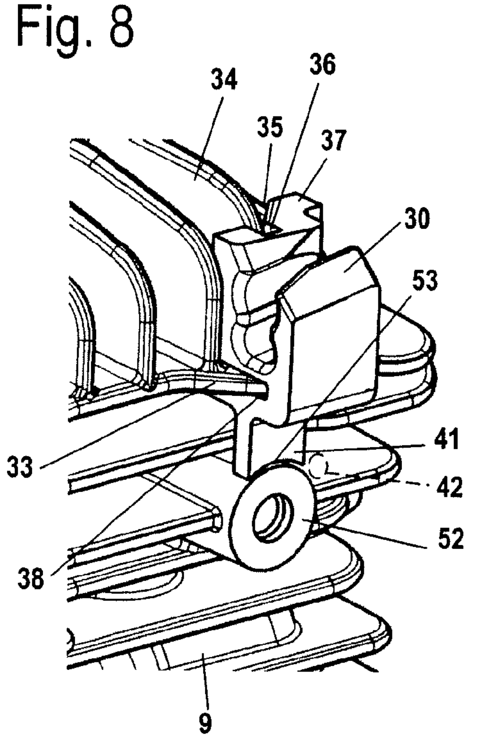
FIG. 8 shows a perspective illustration of a detail of the cylinder with a cable retainer arranged thereon.

FIG. 8 shows the arrangement of the bearing web 41 of the cable retainer 30 adjacent to an upper screw boss 52 at which the ignition module 19 is screwed tight to the cylinder 9. The screw boss 52 has a round external diameter. The bearing web 41 has, in the exemplary embodiment, a bearing surface 53 which is of curved design and which is seated on the outside of the screw boss 52. However, there may also be a distance between the bearing face 53 and the screw boss 52. As is shown schematically by FIG. 8, the positioning pin 42 of the insulating element 21 is adjacent to the screw boss 52 and adjacent to the bearing web 41.

Figure 9:
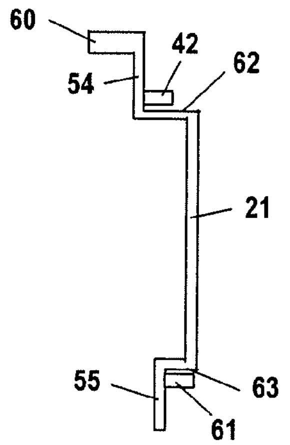
FIG. 9 shows the insulating element of the internal combustion engine in a side view.
Figure 10:
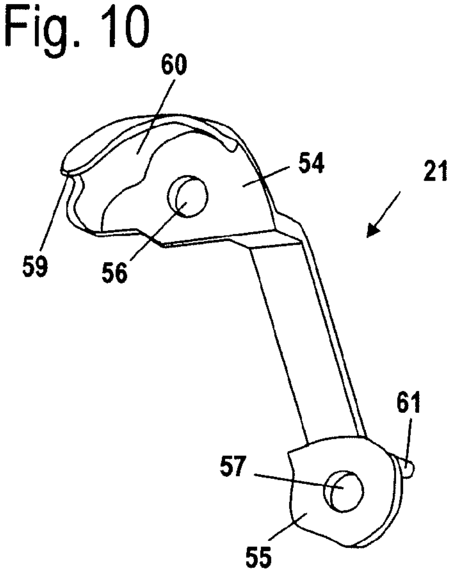
FIG. 10 shows a perspective illustration of the insulating element.

The FIGS. 9 and 10 show the configuration of the insulating element 21. The insulating element 21 has a bearing face 54 for bearing against the upper screw boss 52 and a bearing face 55 for bearing against the lower screw boss 24. The lower screw boss 24 is shown in FIG. 2. The bearing face 54 is partially surrounded by a wall 60 on which the stop 59 is formed. The bearing face 54 has a bore 56 for a fastening screw 25 and the bearing face 55 has a bore 57 for a fastening screw 25. The ignition module 19 is screwed to the cylinder 9 using the two fastening screws 25. The area of the insulating element 21 which extends between the two bearing faces 54 and 55 is arranged offset with respect to the cylinder 9. As a result, a shoulder 62 is formed adjacent to the bearing face 54, and a shoulder 63 is arranged adjacent to the bearing face 55. The positioning pin 42 is arranged on the bearing face 54, and a further positioning pin 61 is arranged on the bearing face 55, adjacent to the shoulders 62 and 63, respectively. The positioning pins 42 and 61 serve to pre-position the insulating element 21 on the cylinder 9 during assembly of the internal combustion engine. The bearing face 54 secures the bearing web 41 of the cable retainer 30 to the cylinder 9.

Figure 11:
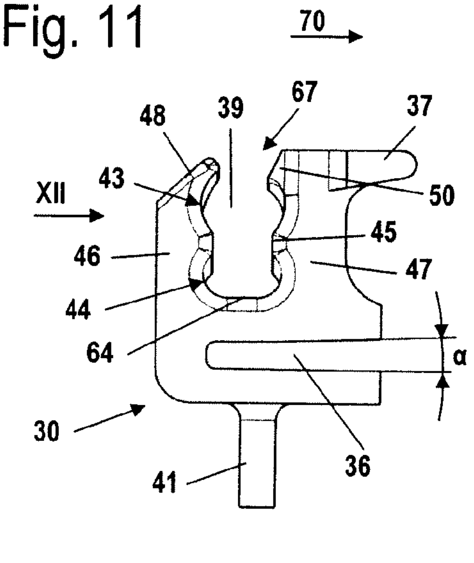
FIG. 11 shows a side view of the cable retainer.

The FIGS. 11 to 16 show the cable retainer 30. As is shown by FIG. 11, the receptacle 39 has an upper section 43 for the ignition cable 18 and a lower section 44 for the grounding cable 26 and the control cable 27 (see also FIG. 6). The two sections 43 and 44 are separated from one another by a constriction 45. The constriction 45 allows the grounding cable 26 and the control cable 27 to be clipped into the lower section 44. The receptacle 39 is bounded by an outer limb 46, positioned facing away from the cylinder 9, and an inner limb 47 arranged adjacent to the cylinder 9. The second slot 36 is positioned adjacent to the bottom area 64 of the receptacle 39. As is shown by FIG. 11, the side walls of the second slot 36 are inclined with respect to one another and enclose an angle $\alpha$ with one another which may be, for example, 0.5° to 4°. The angle $\alpha$ is advantageously approximately 2°. The angle $\alpha$ opens here onto the side facing the inner limb 47 and the cylinder 9. Owing to the inclined side wall of the slot 36, the inner limb 47 is embodied so as to be moveable even if the cable retainer 30 is arranged on a first cooling fin 33. As is shown by FIG. 6, a gap, which becomes larger toward the internal combustion engine 8 is formed between the cable retainer 30 and the first cooling fin 33. This permits a sprung movement of the inner limb 47. As a result, the ignition cable 18 can be clipped into the cable retainer 30 and is retained clamped in the cable retainer 30. In order to permit the cable retainer 30 to be installed adjacent to a housing wall the cable retainer 30 has an outer slope 48 which faces a housing wall of the housing 2. The profile of the housing 2 adjacent to the cable retainer 30 is shown schematically in FIG. 2.

Figure 12:
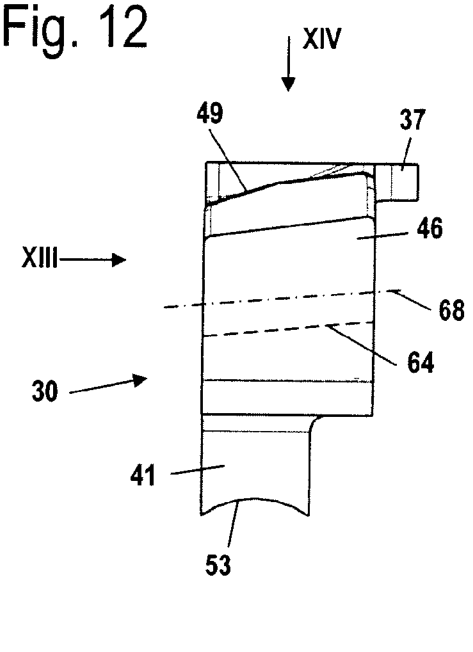
FIG. 12 shows a side view of the cable retainer in the direction of the arrow XII in FIG. 11.

As is shown in FIG. 12, the second limb 46 has, on its upper side, an insertion slope 49 whose function will be explained in the text which follows. As is shown in FIG. 11, an insertion slope 50 is provided on the inner limb 47 lying opposite. In FIG. 12 the profile of the bottom area 64 of the receptacle 39 is also shown schematically. As is shown in FIG. 12, the bottom area 64 extends in a slightly inclined fashion so that the longitudinal direction 68 of the cables 18, 26 and 27 which are retained in the cable retainer 30 is also inclined with respect to the first cooling fin 33.

Figure 15:
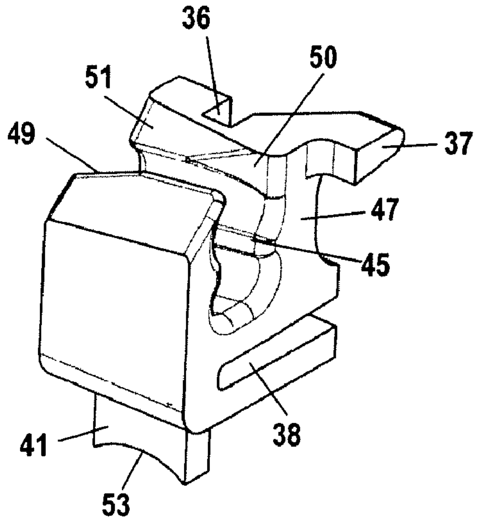

The profile of the insertion slopes 49 and 50 can be seen in particular in FIG. 15. The insertion slope 49 is provided on the side of the cables 18, 26, 27, said insertion slope 49 being connected to the ignition module 19, while the insertion slope 50 is arranged on the opposite side, that is to say at the exit of the cables from the cable retainer 30.

Figure 14:
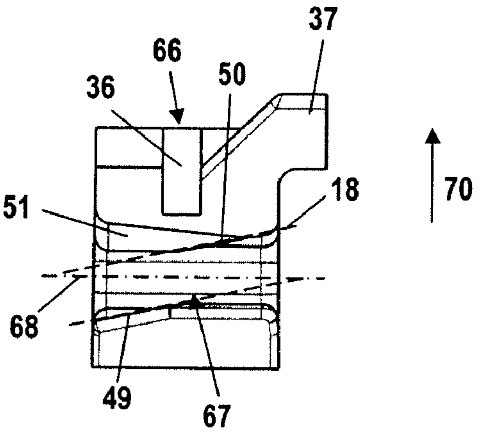
FIG. 14 shows a plan view of the cable retainer in the direction of the arrow XIV in FIG. 12, and FIG. 15 and FIG. 16 show perspective illustrations of the cable and retainer.

As is shown in FIG. 14, the insertion slopes 49 and 50 are embodied in such a way that an ignition cable 18 (shown by dashed lines in FIG. 14) can be fitted obliquely onto the longitudinal opening 67. The ignition cable 18 can be arranged in the cable retainer 30 by means of a pulling movement. Assembly is facilitated by the insertion slopes 49 and 50. During assembly, the ignition cable 18 is turned at the position shown by dashed lines in FIG. 14 until the longitudinal direction of the cable coincides with the longitudinal direction 68 of the cable which is shown by dot dashed lines in FIG. 14. As a result, the cable retainer can be short in design. There is no need for long spring arms of the limbs 46, 47.

Figure 13:
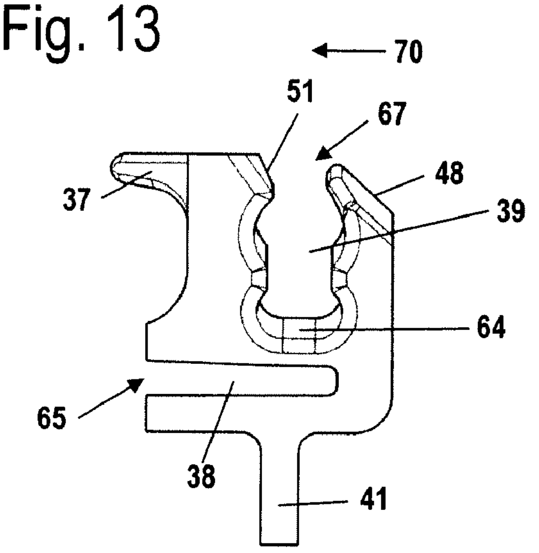
FIG. 13 shows a side view of the cable retainer in the direction of the arrow XIII in FIG. 12.

In order to permit the cable retainer 30 to be plugged on, the first slot 38 has the plug-in opening 65 which is shown in FIG. 13. The second slot 36 has the plug-in opening 66 which is shown in FIG. 14. In order to facilitate assembly and at the same time to retain the ignition cable in the receptacle 39, the bevel 51 which is shown in FIG. 15 is provided on the inner limb 47, adjacent to the longitudinal opening 67 of the receptacle 39.

Figure 16:
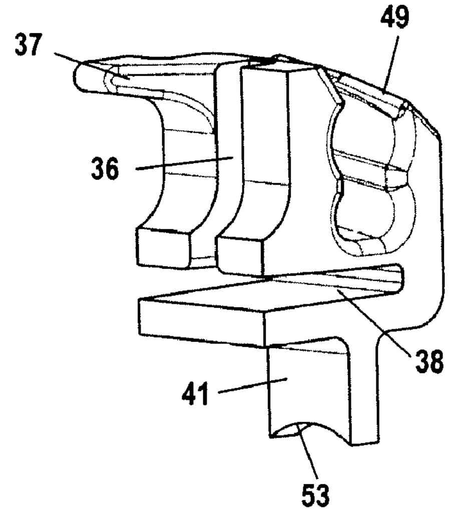

As is shown in particular by FIG. 16, the first slot 38 and the second slot 36 together form an essentially T-shaped groove depression. As a result, the cable retainer 30 can easily be plugged onto cooling fins of the cylinder 9.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An internal combustion engine having a cylinder which has a cylinder longitudinal axis, and having at least one cooling fin, wherein a cable retainer is provided which is arranged on at least one cooling fin of the internal combustion engine and which retains at least one cable.

2. The internal combustion engine as claimed in claim 1, wherein the cable retainer is arranged on the cylinder of the internal combustion engine.

3. The internal combustion engine as claimed in claim 1, wherein the cable retainer has means for positioning the cable retainer on the internal combustion engine.

4. The internal combustion engine as claimed in claim 3, wherein the cable retainer has at least one slot with which the cable retainer is plugged onto a cooling fin.

5. The internal combustion engine as claimed in claim 4, wherein that the cable retainer has a first slot which receives a first cooling fin which is transverse with respect to the cylinder longitudinal axis, and in that the cable retainer has a second slot which receives a second cooling fin which extends transversely with respect to the first cooling fin.

6. The internal combustion engine as claimed in claim 3, wherein the cable retainer has a stop which is adjacent to a cooling fin, wherein this cooling fin is formed at a lower position than an adjacent cooling fin.

7. The internal combustion engine as claimed in claim 1, wherein the cable retainer has a receptacle in which at least one cable is retained.

8. The internal combustion engine as claimed in claim 7, wherein the receptacle is bounded by at least two limbs, wherein at least one of the limbs is sprung.

9. The internal combustion engine as claimed in claim 8, wherein the receptacle is accessible via a longitudinal opening which is bounded by at least two limbs, wherein at least one of the limbs has, adjacent to the longitudinal opening, an insertion slope which extends inclined with respect to the longitudinal direction of the cable.

10. The internal combustion engine as claimed in claim 7, wherein a slot extends adjacent to the bottom area of the receptacle, wherein the side walls of the slot are inclined with respect to one another at an angle (.alpha.) which opens toward the internal combustion engine.

11. The internal combustion engine as claimed in claim 7, wherein at least one cable is held clamped in the receptacle.

12. The internal combustion engine as claimed in claim 7, wherein the receptacle has a lower section and an upper section between which a constriction is arranged, wherein a cable which closes off the lower section of the receptacle is held clamped in the upper section, and wherein at least one cable which is secured in the receptacle by the cable in the upper section is arranged in the lower section of the receptacle, wherein the diameter (b, c) of the cable in the lower section is smaller than the diameter (a) of the cable in the upper section.

13. The internal combustion engine as claimed in claim 1, wherein means for securing the cable retainer to the internal combustion engine are provided.

14. The internal combustion engine as claimed in claim 13, wherein the internal combustion engine has an ignition module, and wherein the cable retainer is arranged adjacent to the ignition module, wherein at least one cable which is retained by the cable retainer is connected to the ignition module.

15. The internal combustion engine as claimed in claim 14, wherein the ignition module is fixed to at least one screw boss of the internal combustion engine via an insulating element, and wherein the insulating element secures the cable retainer to the internal combustion engine.

16. The internal combustion engine as claimed in claim 15, wherein the cable retainer has a bearing web, wherein the cable retainer is plugged onto the internal combustion engine in an insertion direction and wherein the insulating element secures the bearing web in the insertion direction of the cable retainer.

17. The internal combustion engine as claimed in claim 15, wherein the insulating element has at least one stop for the connection of a cable which is retained in the cable retainer.

18. A cable retainer for securing at least one cable to an internal combustion engine, wherein the cable retainer has at least one receptacle for at least one cable, and a first slot for plugging the cable retainer onto at least one cooling fin of the internal combustion engine.

19. The cable retainer as claimed in claim 18, wherein the cable retainer has a second slot for plugging the cable retainer onto at least one cooling fin of the internal combustion engine.

20. The cable retainer as claimed in claim 19, wherein the two slots extend transversely with respect to one another in a plane which extends perpendicularly with respect to the insertion direction.

21. The cable retainer as claimed in claim 19, wherein a slot extends adjacent to the bottom area of the receptacle, wherein the side walls of the slot are inclined with respect to one another in the insertion direction by an angle (.alpha.), wherein the angle (.alpha.) opens toward the plug-in opening of the slot.

22. The cable retainer as claimed in claim 18, wherein the receptacle is bounded by two limbs, wherein at least one of the limbs is embodied in a sprung fashion.

23. The cable retainer as claimed in claim 18, wherein the cable retainer is composed of plastic.

24. The cable retainer as claimed in claim 18, wherein the cable retainer is embodied in one piece.

* * * * *